United States Patent Office 2,951,796
Patented Sept. 6, 1960.

2,951,796
INORGANIC AND ORGANOMETAL COMPOSITIONS

Simon L. Ruskin, New York, N.Y., assignor to Union Carbide Corporation, New York, N.Y., a corporation of New York No Drawing. Filed Dec. 15, 1955, Ser. No. 553,186

4 Claims. (Cl. 204—158)

My invention relates to inorganic and organic metal compositions that catalyze hydrocarbon reactions leading to polymerizations, condensations, ring formations, depolymerizations, cracking and reforming.

This is a continuation-in-part of my earlier filed applications, Serial Numbers:

469,550—Promotion of Chemical Reactions, filed November 17, 1954;
492,803—Metallo-Ceramic Preparations, filed March 7, 1955;
526,766—Metallo-Concrete Preparations, filed August 7, 1955;
534,623—Metallo-Glass Compositions, filed September 15, 1955;
525,085—Catalytic Conversion of Petroleum, filed July 28, 1955;
512,580—Process for Treatment of Reservoir Gases, filed June 1, 1955;
499,203—Process for Treatment of Petroleum, filed April 4, 1955;
541,051—Metallic Compositions, filed October 17, 1955.

I have found that metalloceramic compositions such as aluminum silicate oxides, chromium, aluminum silicates, chromium aluminum silicates with zirconium oxide or strontium or thorium, as well as other metallic oxides, establish a heterogeneous equilibrium that is readily activated by gamma radiation usually in the range of 100 million R. to 400 million R., although lower levels are at times effective so that an excited state is induced in the heterogeneous equilibrium whereby a free electron or a free ion or free radical becomes available for the induction of polymerizations particularly of hydrocarbons such as ethylene, propylene, butene, pentene, hexene or their unsaturated derivatives.

To induce this excited state in my metallo ceramic compositions, I may employ gamma irradiation from any source yielding gamma irradiation such as radioactive isotopes, nuclear reactor, electron accelerator or high voltage X-ray, usually in dosage of 100 million R. to 400 million R., although at times I may employ smaller dosages.

Where inorganic heterogeneous equilibrium is desired such as chromium aluminum silicate, I may employ my irradiation at the time of bringing the various components together or after sintering the heterogeneous equilibrium or both before and after sintering the composition. I may conduct the polymerization reaction under the irradiation with 100 million R. or lower or I may use my irradiated catalyst to induce polymerization under customary conditions of heat and pressure. I prefer, however, to conduct my polymerization with my irradiated catalyst under conditions of gamma irradiation whereby a minimum of heat and pressure is required.

While I may employ unsaturated olefins for polymerization such as acetylene, ethylene, propylene, butene, pentene or hexene, I may also induce copolymerization by employing mixtures of ethylene with acetylene or ethylene and propylene and the like. Or I may cause metallic elements of the catalyst to be combined with the polymer to alter its properties.

Where heterogeneous equilibrium is established in inorganic compositions and ionic and electronic conduction is induced in the excited state by my irradiation with 100 million R. to 400 million R., I may employ an inert higher hydrocarbon such as hexane or isooctane as a suspension medium for my catalytic composition or I may employ the higher hydrocarbon as a solvent or carrier of my olefin to be polymerized, and flood the olefin over a bed of solid ceramo-metallic composition excited by gamma irradiation with 3 million R. to 100 million R. With my excited state metallo-ceramic composition, usually 3 million R. to 15 million R. will readily induce polymerization although higher dosages may at times be desirable.

The polymerizations so induced may yield liquid polymers, gummy polymers or solid polymers which may be separated by selective precipitants from the suspending hydrocarbon solution such as various alcohols, ketones or alkylketones and the separation completed by commonly used methods of distillation, crystallization, precipitation or compression.

Where organometal compositions are employed, free radical formation is induced by my irradiation of the compounds with 3 million R. to 10 million R. or higher. Thus reactions requiring heat and pressure for their reaction may proceed spontaneously under gamma irradiation with 3 million R. to 100 million R., thus eliminating costly equipment, particularly where corrosive materials are employed and with greater safety where high pressures are usually employed. Thus, metal alkyl compounds which are explosive under heat and pressure may be safely reacted with metal halides under gamma irradiation with 3 million R. to 10 million R. or higher. These must be very cautiously dealt with under customary conditions of heat and pressure since explosions have been known to occur from such reactions.

A still further advantage of my organometal compounds reacting under my irradiation with 3 million R. to 10 million R. is that it makes possible and promotes copolymerization at a greater rate and requires less of isolated pure compounds.

A great virtue of my organometal catalysts irradiated with 3 million R. to 100 million R. lies in the excited state produced by the irradiation in the conjoint presence of the organic radical and the metal whereby, particularly in the transition metals, partially vacant "d" orbitals are promoted to "p" orbitals and low energy orbitals become valence orbitals, and the metals tend to react with higher valencies as, for example, chromium which readily becomes hexavalent. Simultaneously, the organic radical, particularly light sensitive alkyl or alkyl halides which are sensitive to light photons, become greatly excited by my gamma radiation and are thus rendered very reactive.

Thus I have found that by my process of irradiation with 100 million R. to 400 million R. or higher dosages, I am able to induce negative ion formation. Particularly, I produce hybrid formation of the metallic orbitals which simultaneously influences the packing of the metallic molecules, the alloying of two or more metals or the improved surface action of metallic compounds for catalytic polymerizations.

As a result of my induced molecular orbital changes leading to orbital hybrid formation, a predominance of tetrahedral hybridization occurs with the formation of covalent and ionic crystal structure possessing a free negative electron capable of inducing polymerization of a suitable compound on its surface. While metallic oxide and alkyl metallic crystals have been employed for such catalytic purposes, their effect has not been of very high efficiency, and contaminating amounts of the metal commonly appear in the polymerized compound. Also, branched compounds form mixed with linear. When, however, the metallic oxides, more particularly of the transition elements or of the third periodic group are irradiated with 100 million R. to 400 million R., virtually a 100% negative ion availability of the crystal surface occurs and polymerization reactions are produced yielding more rapid reaction, greater regularity, high molecular weight and linear formation. Thus, for example, while titanium oxide and aluminum triethyl will provide a catalytic surface for the polymerization of ethylene, the irradiation of titanium oxide as well as aluminum triethyl, with 100 million R. to 400 million R. provides a marked increase in the availability of a negative ion with an increased efficiency of polymerizing action.

While the above compounds are mentioned as an example, other crystalline solids irradiated with 100 million R. to 400 million R. and endowed with a free negative electron, will similarly induce rapid polymerizing reaction, high regularity, high molecular weight and linear formation. Since the halogens possess the highest electronegativity, they are uniquely well suited for this enhancement.

Preferably I choose crystalline solids capable of undergoing bond dislocation with promotion of a "d" orbital to a "p" orbital such as the transition elements and halogen compounds of the transition elements. The valence properties of the transition elements are still not fully understood. Nevertheless, the promotion of "d" orbitals to "p" orbitals may be induced by irradiation with 100 million R. to 400 million R.

Another condition induced by my irradiation with 100 million R. to 400 million R. is the formation of crystals bound by both covalent and ionic forces where the metal atom possesses a free negative electron. Such crystals present surfaces which possess bonds capable of loosely holding other molecules in uniform layer. Where a molecule possessing a double bond uniformly adheres to such surface of a covalent ionic crystal, a free electron is capable of initiating a chain reaction leading to polymerization of the molecules adherent to the surface.

Where coating is desired, the polymer may be left in situ but where the polymer is desired, various solvents for the particular free polymer may be employed as for instance hexane, heptane or cycle heptane isooctane or others commonly known to the art. Where the catalytic action of a solid bed of chromium trioxide and aluminum silicate is desired, I irradiate both components together with 100 million R. to 400 million R, to enhance the negative electron properties, particularly of the chromium trioxide. My irradiated chromium trioxide and aluminum silicate shows a unique capacity for inducing bridging, particularly of carbon complexes, carbon monomers and metal complex compounds.

I have found that similarly the structure of metals and metal alloys may be controlled by my irradiation with 100 million R. to 400 million R., leading to negative ion formation. Thus, the packing of metallic atoms can be changed either to increased solubility, increased ductility, lower melting point with looser molecular arrangement or, on the other hand, to increased hardness, brittleness, higher melting point and closest molecular packing. The difference in the two functions depends upon the valence induced by the irradiation with 100 million R. to 400 million R. or higher dosages.

Thus, the promotion of a "d" orbital to a "p" orbital in nickel loosens the dense packing of the nickel molecule leading to increased solubility, greater separation between the molecules and looser packing with a lower melting point. Thus also I may use nickel aluminum silicate or strontium aluminum silicate or thorium aluminum silicate.

Electron deficient compounds with more low energy orbitals than valence electrons, by my irradiation with 100 million R. to 400 million R., use low energy orbitals in forming bonds, even when combined with atoms or groups containing no unshared electron pairs. Thus bonds are delocalized in the presence of "excess" orbitals and a variety of compositions may result. Systems possessing unused low energy orbitals give delocalization of bonds upon irradiation with 100 million R. to 400 million R. with control of physical properties. Thus chromium trioxide becomes excited hexavalent chromium and an excellent polymerization catalyst.

Ionic structures play a much greater role in the metal than in the diatomic molecule and bonding energy is much greater for a metal than for the corresponding diatomic molecule. Increasing the energy of atomic orbitals shifts the direction to metal.

Among the organometal compounds that I have found particularly useful are those derivatives of metals of group III. Compounds of these are readily reactive with the transition metals, particularly the halides, sulfides, oxides, and nitrates. Of particular merit for my reactions are the alkyl compounds of the metal group III such as $R_3Al$.

Thus I have found that when aluminum triethyl is reacted with titanium tetra chloride, the compound ethyl titanium trichloride and aluminum chloride are formed. Diethyltitanium dichloride also forms to a lesser extent. By irradiating ethyl titanium trichloride and diethyl titanium dichloride in the presence of ethylene or ethylene and acetylene, under irradiation with 3 million R. to 10 million R. or more, polymerization of the ethylene is induced and the polymer follows the molecular lattice structure of the titanium forming crystals that resembles the close packing of the titanium surface. The resultant polyethylene thus has high molecular weight from 30,000 to 100,000 or it may go to 3,000,000 yielding a substance of great hardness. Since the lattice structure of the titanium surface is followed, there is virtually no branching and the polymer is linear. Also the melting point is high and a polyethylene is formed possessing new and unique properties of great value.

To prepare my new compound ethyl titanium trichloride and diethyl titanium dichloride, I proceed as follows:

100 grams mercury diethyl is placed in 200 grams of aluminum in a tube and sealed. It is heated in a water bath for six hours. The compound is then distilled over fresh aluminum and afterwards distilled in hydrogen. The aluminum triethyl is a clear colorless liquid with boiling point 194° C. On addition to water it is decomposed with explosive violence.

By similar procedure I may prepare aluminum trimethyl, aluminum tripropyl, aluminum triisobutyl, aluminum triisoamyl, aluminum triphenyl.

To 4 grams titanium tetrachloride in 100 grams hexane, is added 8 grams aluminum triethyl under nitrogen. The ethyl titanium trichloride remains in solution in the hexane while the aluminum chloride mixed with some ethyl titanium chloride precipitates as a blackish precipitate. The precipitate may be separated from the ethyl titanium chloride and the polymerization conducted with the clear solution or the precipitate may be allowed to remain so as to utilize the ethyl titanium chloride that has come down with the aluminum chloride. To some extent also, aluminum chloride forms a soluble complex with the ethyl titanium chloride which does not interfere with the reaction. The reaction must be conducted in the absence of air or moisture and is preferably conducted under nitrogen or argon. The resultant compound is thus:

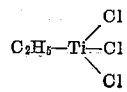

and

When the ethyl titanium trichloride is dissolved in hexane and the ethylene is led in under moderate pressure and agitation and the whole irradiated with 3 million R. to 10 million R. or more. The $C_2H_5$ becomes an excited free radical and reacts with the $CH_2=CH_2$ to form a cascade of polymerizing bonds $C_2H_5.CH_2=CH_2$.

Thus ethyl titanium chloride is a valuable polymerizing agent in itself which can induce polymerization under conventional conditions of heat and high pressure but when the reaction is conducted under gamma irradiation of 3 million R. to 10 million R. or higher, the state of excitation of the free radical is higher than that occurring under heat and pressure, the polymerization more rapid and uniform and the action of the catalyst markedly prolonged. Thus less catalyst is required and facility of operation promoted.

While I have described the chloride of titanium, other halides, particularly fluorine may be employed. To facilitate the handling of aluminum triethyl, I may prepare a double compound of aluminum triethyl such as aluminum triethyl with aluminum bromide $(C_2H_5)_3Al.AlBr$ and then react it with titanium tetrafluoride to form an ethyl titanium fluoride aluminum fluoride complex.

Instead of ethyl titanium trichloride, I may also employ other organometal compounds of the metals of group III such as indium diphenyl chloride or thallium dimethyl chromate or thallium diethyl fluoride or chloride.

With my organo metal compounds of group III I may react halides, nitrates or acetates of metals from groups IV to group VIII.

To prepare my inorganic metallo ceramic compositions as catalysts for the polymerization of hydrocarbon olefins such as acetylene, ethylene, propylene, butylene, pentene and hexene or combinations thereof, I add chromium trioxide or nitrate or acetate to aluminum silicate gel and irradiate with 3 million R. to 10 million R. The whole is now sintered at 500° C. to 700° C. The dried mass is now pulverized and irradiated with 100 million R. to 400 million R. The metallo ceramic granules are now highly catalytic for the polymerization, particularly of ethylene, acetylene and propylene, requiring very little heat or pressure particularly when the reaction of polymerization is conducted under gamma irradiation of 3 million R. to 10 million R. or higher.

My catalytic metallo ceramic granules may be employed as a bed or suspended in an inert hydrocarbon such as hexane, pentane, cyclopentane or isooctane.

The resultant polymer can either be removed by solvents such as the inert hydrocarbon, hexane, and precipitated therefrom by methyl alcohol or organic ketone, or removed as a solid by washing with water.

Thus the metallo ceramic granules irradiated with 100 million R. are packed in a cylinder surrounded by a cobalt 60 source of 1000 curies and properly sheathed. A flow of ethylene simultaneously with a flow of hexane under 200 lbs. pressure at 60° C. to 90° C. is allowed to fill the cylinder until the radiation dose of 10 million R. to 25 million R. is reached. The liquid is drained off and the polymer is precipitated with methanol. Solid polymers adherent to the metallo ceramic granules may be washed off with fresh hexane and reprecipitated.

Instead of chromium oxide, or aluminum silicate cermet, I may use in addition, indium, gallium, zirconium, thorium, strontium, and cerium together or independently in heterogeneous equilibrium. The percentages of chromium, zirconium, thorium, indium, gallium, cerium or strontium may vary from 0.1% to 10%, depending on the type of reaction desired. Or I may employ various forms of Grignard reagents. Instead of titanium tetrachloride I may employ other transition metal halides such as zirconium tetrachloride or acetates or acetyl acetonates of the metals. Instead of α-olefins I may employ olefinic halides.

Example I

To 4 grams titanium tetrachloride in 100 grams hexane is added 8 grams aluminum triethyl under nitrogen. The whole is irradiated with 3 million R. to 25 million R. until a blackish precipitate forms.

50 grams of fresh hexane is added and ethylene gas under 75 atmosphere pressure is led in. Under vigorous stirring the pressure drops to zero and fresh ethylene is introduced four or five times, until approximately 60 grams of ethylene has been used. A flocculent white precipitate forms which solidifies on the addition of 100 cc. methanol. The polymerization reaction proceeds usually at room temperature or under moderate heating.

To speed the reaction the whole may be irradiated with 3 million R. to 25 million R. while the ethylene is being introduced into the hexane-ethyl-titanium trichloride mixture. The resultant polyethylene polymer becomes intensely hard and has higher molecular weight and higher melting point than the conventional polyethylene.

The reaction which takes place under the action of the irradiation from 3 million R. to 25 million R. of titanium tetrachloride and aluminum triethyl is the formation of ethyltitanium trichloride and aluminum chloride. Under the excited state of the reaction the ethyl radical initiates the polmerization of the ethylene.

Example II

To 500 grams of aluminum silicate gel containing 10 to 20% alumina and 80%–90% silica, is added 5 grams chromium trioxide. The whole is irradiated with 10 million R. from a cobalt 60 source. The gel is then sintered to 700° C. to produce a friable mass of metallo cermet. The cermet is ground to coarse granules and filled into a cylinder having an outlet at the bottom.

Ethylene under 250 lbs. pressure is allowed to stream into an inflow tube simultaneously with hexane that has been heated to 80° C. until the pressure in the cylinder is 175 lbs. The cylinder is then immersed in a canister housing a cobalt 60 source of 2000 curies. The pressure in the cylinder begins to fall after about 25 million R. and continues to fall to zero. The cylinder is removed from the canister and the liquid drained off.

To the liquid is now added 100 cc. of methanol. A whitish flocculent precipitate forms which is readily separated.

Compression of the precipitate gives a solid mass which hardens to great rigidity. The solid is a high molecular weight polyethylene.

While I have illustrated polmerization of ethylene by organo metal compounds, and inorganic cermet excited by gamma radiation of 3 million R. to 400 million R., it is readily apparent that many other polymerizations may readily be performed according to the methods and procedure described.

What I claim is:

1. The process of producing polyethylene which comprises gamma irradiating a solution of ethyl titanium trichloride dissolved in hexane with 3 million R. to 25 million R. and introducing ethylene gas into said solution.

2. The process of producing polyethylene which comprises gamma irradiating a solution of ethyl titanium trichloride dissolved in hexane with 3 million R. to 25 million R., introducing ethylene gas into said solution and precipitating the polyethylene formed thereby by adding methanol to said irradiated solution.

3. The process of producing polyethyene which comprises gamma irradiating a solution of ethyl titanium trichloride dissolved in hexane with 3 million R. to 25 million R., introducing ethylene gas into said solution, irradiating said solution with 3 million R. to 25 million R. while said ethylene gas is being introduced into said solution and precipitating the polyethylene formed thereby by adding methanol to said irradiated solution.

4. The process of producing polyethylene which comprises gamma irradiating a solution of titanium tetrachloride and aluminum triethyl with 3 million R. to 25 million R., adding hexane to said solution, introducing ethylene gas into said solution and precipitating the polyethylene formed thereby by adding methanol to said irradiated solution.

References Cited in the file of this patent

UNITED STATES PATENTS

| | | |
|---|---|---|
| 2,331,473 | Hyman | Oct. 12, 1943 |
| 2,600,202 | Caird | June 10, 1952 |
| 2,618,615 | Connolly | Nov. 18, 1952 |
| 2,631,975 | Lawson | Mar. 17, 1953 |

FOREIGN PATENTS

| | | |
|---|---|---|
| 714,843 | Great Britain | Sept. 1, 1954 |

OTHER REFERENCES

Nucleonics, vol. 11 (October 1953), page 20.